March 30, 1948.　　　　P. KEMENY　　　　2,438,703
SPEED REGULATOR
Filed July 3, 1946
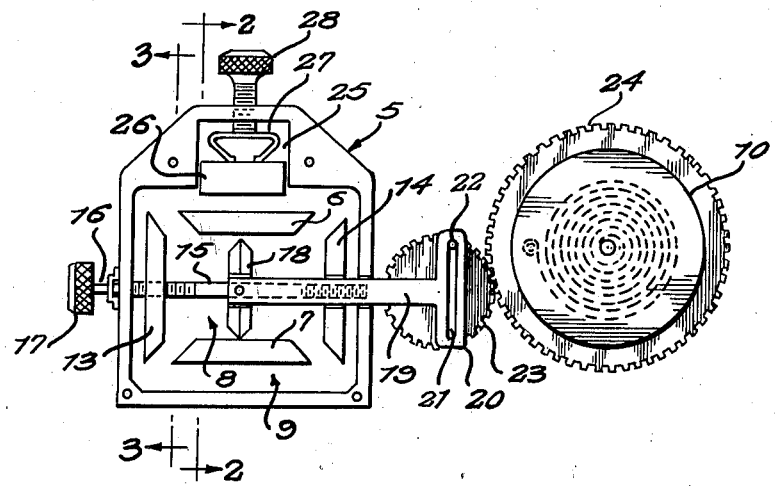
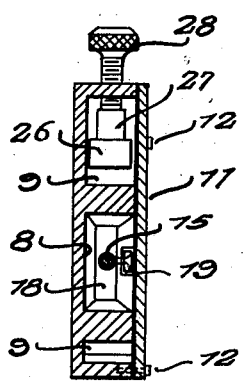
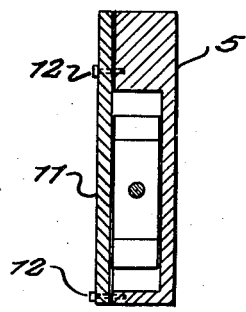
Inventor
PAULO KEMENY
By *Clarence A. O'Brien and Harvey B. Jacobson*
Attorneys Patented Mar. 30, 1948

2,438,703

UNITED STATES PATENT OFFICE 2,438,703

SPEED REGULATOR

Paulo Kemeny, Sao Paulo, Brazil

Application July 3, 1946, Serial No. 681,324
In Brazil August 27, 1945

2 Claims. (Cl. 188—97)

This invention relates to a speed regulator of the dash pot type, and the primary object of the present invention is to provide a speed regulator of this kind which is simple in construction, efficient in operation, and otherwise well adapted to meet the requirements for successful commercial use.

A further object of the present invention is to provide a speed regulator of the above kind which is especially suitable for use in regulating the speed of rotation of the main spring barrel of a clock, so as to eliminate the use of a pendulum, escapement mechanism, etc.

A further object is to provide a speed regulator of the above kind which is simple, compact and durable in construction, and easy and convenient to use.

The exact nature of the present invention will become apparent from the following description when considered in connection with the accompanying drawings, in which:

Figure 1 is a side elevational view showing a main spring barrel of a clock provided with a regulator constructed in accordance with the present invention, the cover plate of the speed regulator casing being removed;

Figure 2 is a vertical transverse section through the complete speed regulator, taken on line 2—2 of Figure 1;

Figure 3 is a view similar to Figure 2 taken on line 3—3 of Figure 1.

Referring in detail to the drawing, the present speed regulator includes an oil-filled hollow casing 5 having fixed partial partitions 6 and 7 therein, said partial partitions dividing the casing into a central pressure chamber 8 and an oil space 9 that extends continuously about the top, bottom and ends of the pressure chamber. When the regulator is adapted for use in regulating the speed of rotation of the main spring barrel 10 of a clock, the casing 5 is preferably made of flat-like form as shown, one side wall 11 of the casing 5 being removable to constitute a cover plate. This cover plate seats flatly against the top, bottom and end walls of the casing body and against the adjacent side edges of the partial partitions 6 and 7, screws 12 or the like being provided to secure said cover plate in place and suitable means being provided to afford an oil tight joint between the body of casing 5 and the cover plate 11.

Valve heads 13 and 14, in the form of elongated plates, are movable in the oil space 9 toward and from the ends of the partitions 6 and 7 to adjustably restrict passage of oil into and out of the opposite ends of the pressure chamber 8. Manually operable means is provided to similarly and simultaneously adjust the valve heads 13 and 14 toward or from the partitions 6 and 7, such means preferably consisting of an adjusting screw 15 journaled in opposite ends of the casing 5 and having right and left hand threaded portions having threaded engagement in the respective valve heads 13 and 14. The adjusting screw 15 has a stem 16 projecting at one end of the casing 5 and equipped with an operating knob 17.

Movable in the pressure chamber 8 between the partitions 6 and 7 is a piston plate 18 having a piston rod 19 that slidably projects through one end of the casing 5 for operative connection with the part whose speed is to be controlled. Upon reciprocation of the rod 19 and piston plate 18, the oil is alternately forced out of one end of the pressure chamber 8 past the adjacent valve head and into the opposite end of the pressure chamber 8 by way of the oil space 9. Obviously, by adjusting the valve heads 13 and 14, the flow of oil to and from the chamber 8 may be regulated so as to regulate the speed of movement of piston 18 and its rod 19. This will obviously, in turn, regulate the speed of the part operatively connected to the rod 19.

In operatively connecting the rod 19 with the main spring barrel 10 of a clock, the outer end of the rod 19 is provided with a cross bar 20 having a longitudinal slot 21 in which is movable a crank pin 22 provided on a pinion 23 that meshes with the peripheral gear teeth 24 of the barrel 10. Thus, the rotary movement of barrel 10 is translated into reciprocating movement of the rod 19 and piston plate 18.

The casing 5 also has a recess 25 that communicates with the oil space 9, preferably at the top of the casing as shown. A manually adjustable plunger 26 is movable in the recess 25 and pressed by a spring 27 toward the oil space 9. An adjusting screw 28 is threaded through the top wall of the casing 5 and engages the spring 27, so that adjustment of the screw 28 will adjust the plunger 26 and thereby regulate the pressure exerted on the oil within the casing.

From the foregoing description, it is believed that the construction, operation and advantages of the present invention will be readily understood and appreciated by those skilled in the art. Minor changes and modifications are contemplated such as fall within the scope of the invention as claimed.

What I claim is:

1. A speed regulator of the dash pot type, comprising an oil filled hollow casing, fixed partial partitions in the casing dividing the latter into a central pressure chamber and an oil space extending continuously about the top, bottom and ends of said pressure chamber, valve heads movable in said oil space toward and from the ends of said partial partitions to adjustably restrict passage of oil into and out of opposite ends of the pressure chamber, manually operable means to similarly and simultaneously adjust said valve heads toward or from said partial partitions, and a piston plate reciprocable in said pressure chamber and having a piston rod projecting outwardly of the casing for operative connection with the part whose speed is to be controlled.

2. The construction defined in claim 1, wherein said casing has a recess communicating with said oil space, and a manually adjustable plunger movable in said recess and spring pressed toward said oil space for regulating the pressure exerted on the oil within the casing.

PAULO KEMENY.

REFERENCES CITED

The following references are of record in the file of this patent:

UNITED STATES PATENTS

| Number | Name | Date |
| --- | --- | --- |
| 2,060,833 | Smith | Nov. 17, 1938 |
| 2,429,040 | Zaverl | Oct. 14, 1947 |